June 9, 1936.  P. EHRMANN  2,043,655
COOLING OF ELECTRIC MACHINES
Filed April 28, 1933  5 Sheets-Sheet 1

Inventor:
Paul Ehrmann

June 9, 1936.  P. EHRMANN  2,043,655
COOLING OF ELECTRIC MACHINES
Filed April 28, 1933  5 Sheets-Sheet 2

Inventor;
Paul Ehrmann

Inventor:
Paul Ehrmann

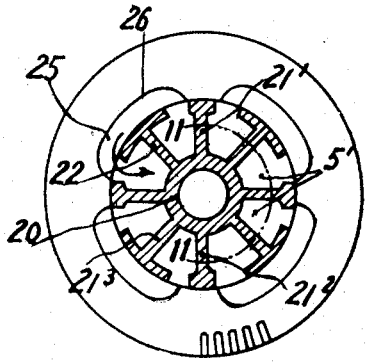
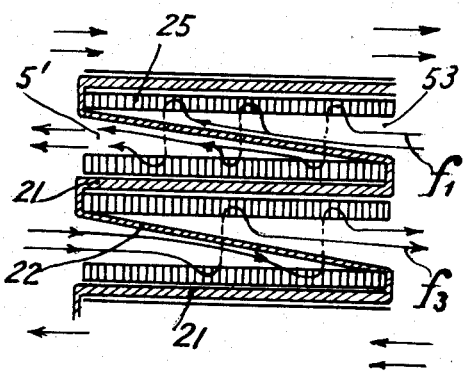
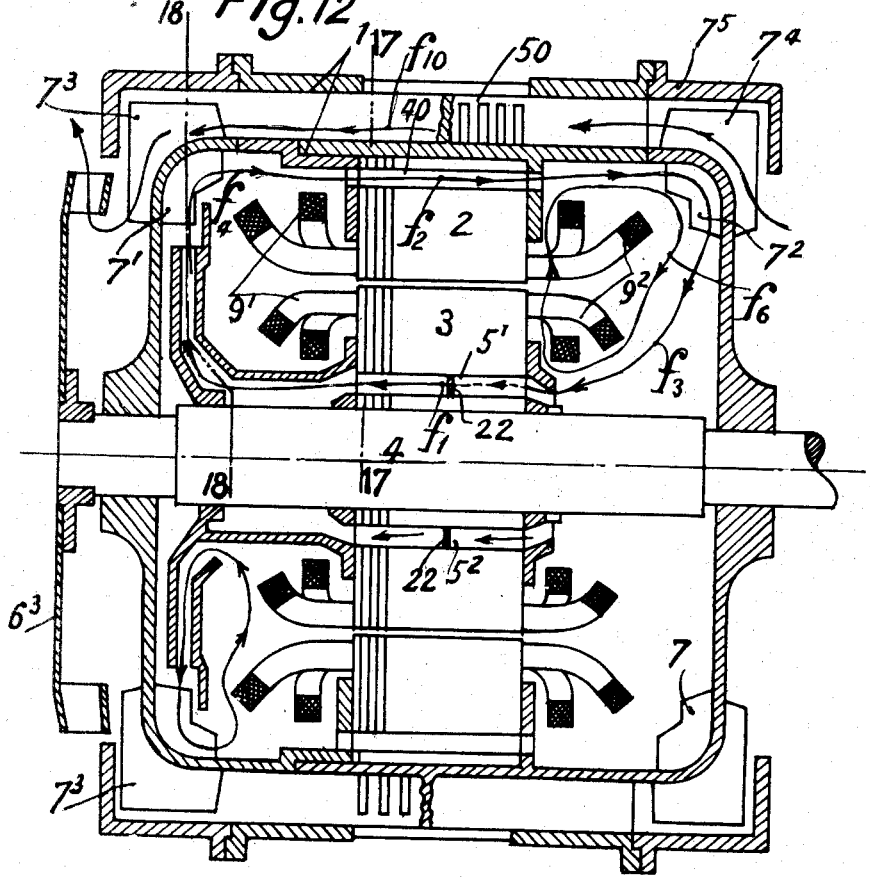

June 9, 1936.  P. EHRMANN  2,043,655
COOLING OF ELECTRIC MACHINES
Filed April 28, 1933   5 Sheets-Sheet 5

Inventor:
Paul Ehrmann

Patented June 9, 1936

2,043,655

UNITED STATES PATENT OFFICE 2,043,655

COOLING OF ELECTRIC MACHINES

Paul Ehrmann, Paris, France

Application April 28, 1933, Serial No. 668,306
In France April 30, 1932

8 Claims. (Cl. 171—252)

The object of the present invention is to effect the cooling of electric machines under conditions equal for both ends of the machine.

Another object is to effect such equal cooling with a minimum discharge of cooling fluid.

A further object is to ensure in an independent manner the cooling of the heads of the windings.

Machines for carrying out these methods have the features set forth in the following description and in the claims annexed to the end thereof.

Constructional embodiments of electric machines according to the invention are illustrated by way of example on the accompanying drawings, in which:—

Figure 6:
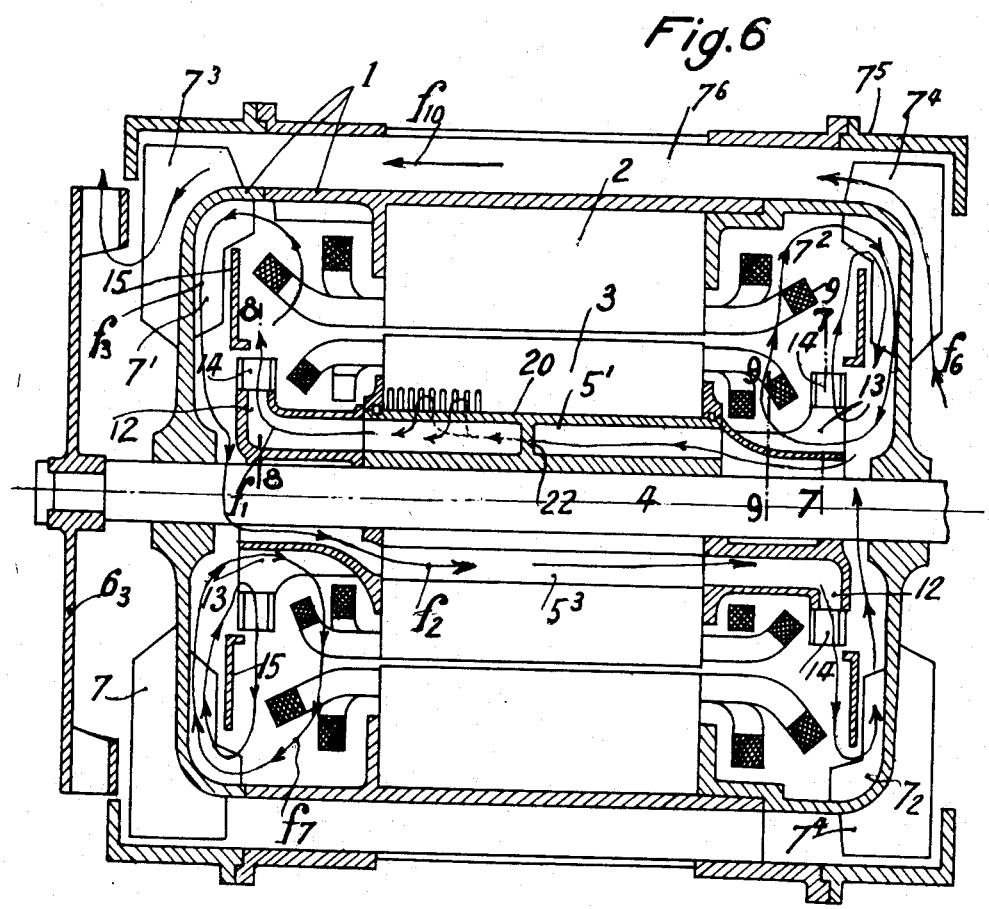
Figure 7:
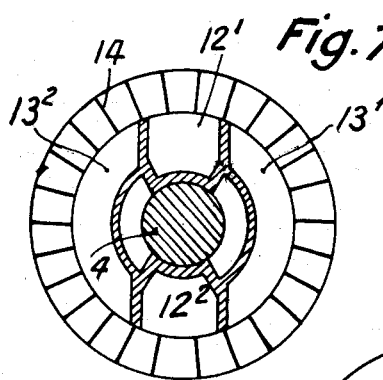
Figure 8:
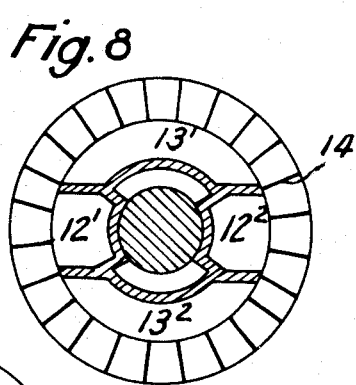
Figure 9:
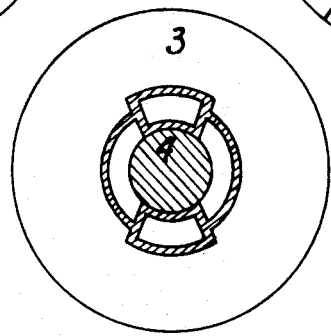

Fig. 6 is a longitudinal section of a further embodiment, this section consisting of two axial half sections in two mutually perpendicular planes, Figs. 7 to 10 are four partial transverse sections of this machine respectively along the lines 7—7, 8—8, 9—9 and 10—10 in Fig. 6, Fig. 11 is a developed section of the rotor along the line 11—11 in Fig. 10.

Fig. 12 is a longitudinal section of a further embodiment.

Figure 18:
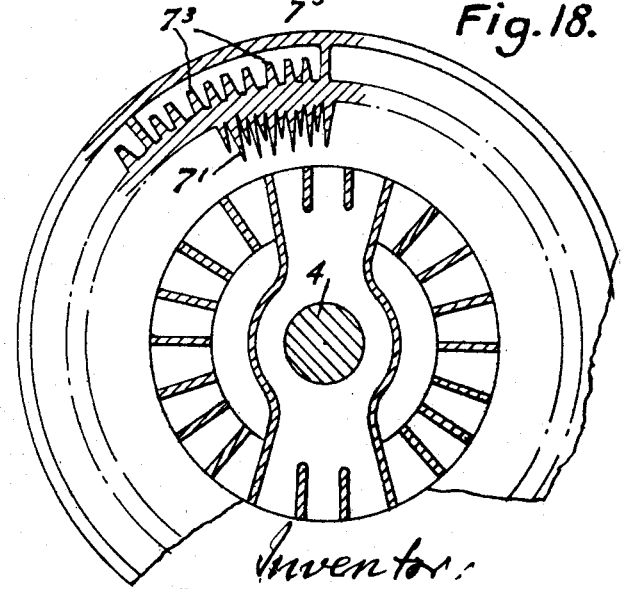
Figure 14:
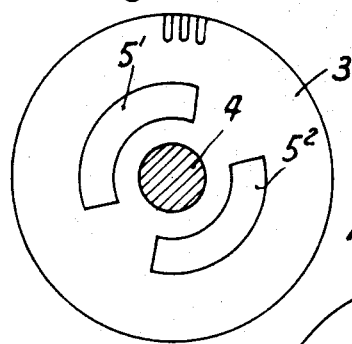
Figure 13:
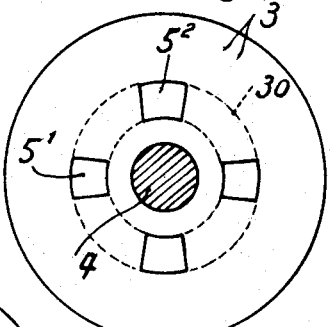
Figure 15:
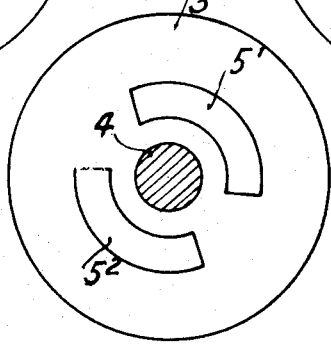
Figure 16:
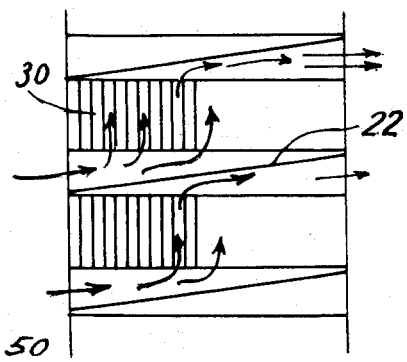
Figure 17:
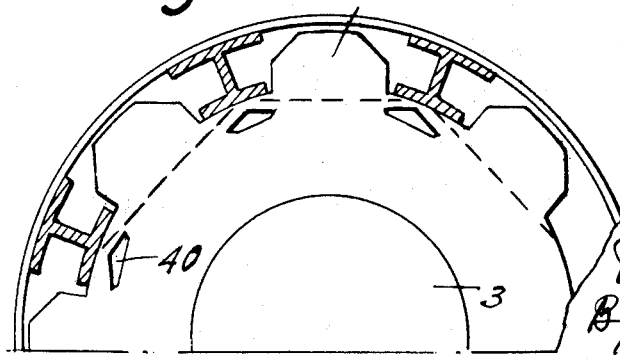

Fig. 13 is a transverse section of the rotor of this machine,

Figs. 14 and 15 are two plans of two laminæ of this rotor,

Fig. 16 is a developed section of this rotor,

Figs. 17 and 18 are two transverse sections of this machine respectively along the lines 17—17 and 18—18 in Fig. 12.

Figure 1:
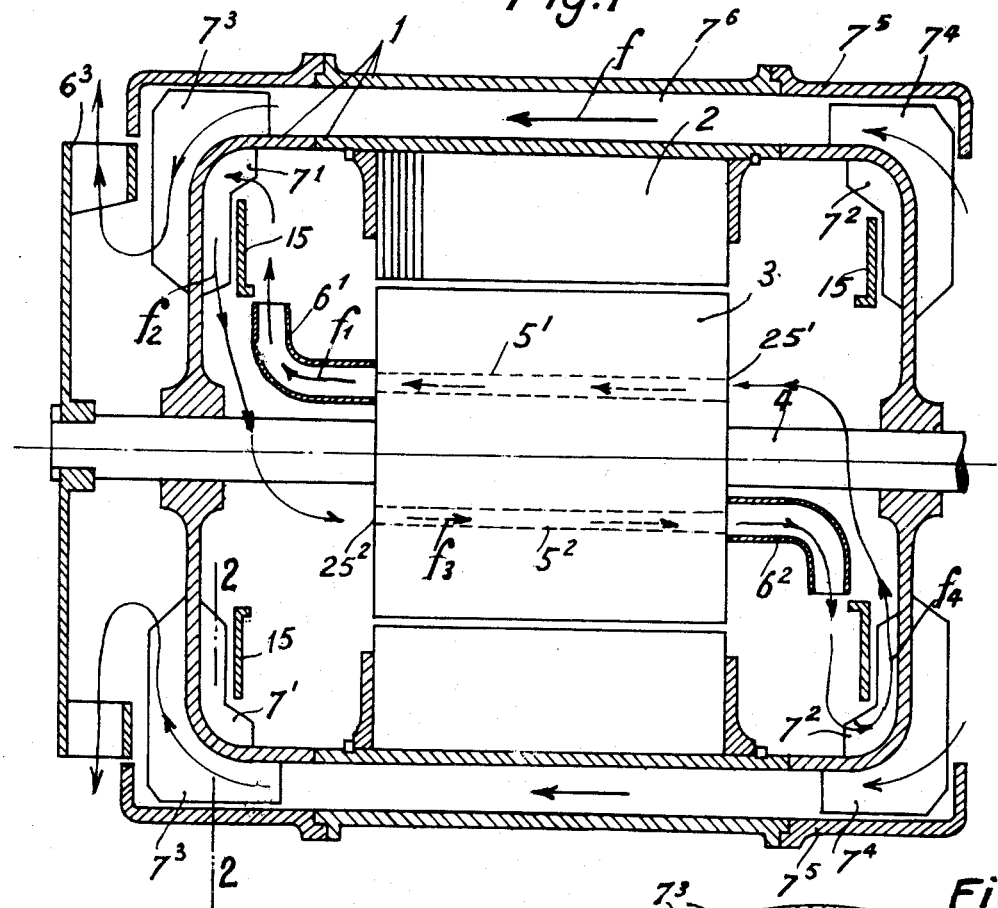
Fig. 1 is a longitudinal section of an electric machine embodying the first method of cooling.
Figure 2:
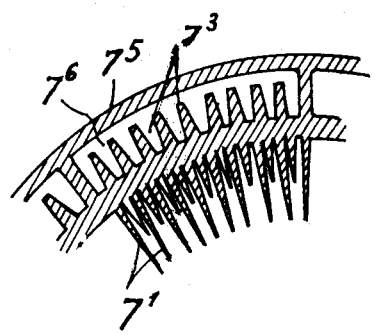
Fig. 2 is a partial section along the line 2—2 in Fig. 1.

The machine illustrated in Figs. 1 and 2 comprises essentially a carcass or casing 1 acting as support for the laminæ of the stator 2 of the machine. The rotor 3 carried on a shaft 4 turns in the stator 2.

The rotor is traversed in both axial directions by a current of air which ensures its effective cooling. For this purpose, the rotor is formed axially from end to end with axial ducts $5^1$ $5^2$. Each axial duct $5^1$ $5^2$ opens at one end $25^1$ $25^2$ freely at the face of the laminated core and at the other end into fans $6^1$ $6^2$. The mouths $25^1$ $25^2$ are formed at opposite faces of the laminated core. Likewise the fans $6^1$ $6^2$ are situated at opposite ends of such laminated core. Thus the current of air drawn by the fan $6^1$ into the ducts such as $5^1$ traverses the rotor 3 in the direction of the arrow $f^1$. This current of air after having traversed the rotor and there being heated is cooled through heat exchange by sweeping for example internal fins $7^1$ provided for this purpose in the casing 1 of the stator.

The current of air $f^2$ suitably cooled is then drawn in the direction $f^3$ and traverses a second time the mass of the rotor 3 by the axial ducts such as $5^2$. The fan $6^2$ which draws in this current of air $f^3$ discharges it in the direction $f^4$, in such a manner that the current of air becomes cooled a second time through heat exchange by sweeping fins $7^2$ also provided in this end of the casing 1 of the stator.

The means for cooling the current of air, such as the fins $7^1$ $7^2$, are themselves cooled through heat exchange by external fins $7^3$ $7^4$ also carried by the casing 1. These latter fins are covered by an external envelope $7^5$ which provides between itself and the carcass 1 an annular space $7^6$ in which a current of cold air $f^{10}$ circulates.

The current of cold air $f^{10}$ is set in motion by an external fan $6^3$ also keyed to the shaft 4 of the rotor and located on one of the end faces of the external envelope $7^5$ whereas the other face of such external envelope is entirely open to permit intake of air.

Thus there is inside the rotor a circulation of cooling air which enables, with a minimum discharge, substantially uniform cooling throughout the entire length of the machine, to be effected.

The internal current of air $f^1$ $f^2$ $f^3$ $f^4$ is moreover effectively cooled by sweeping the internal fins $7^1$ $7^2$ of the carcass whilst the heat discarded by the current of air $f^1$ $f^2$ $f^3$ $f^4$ is immediately transmitted to the external fins $7^3$ $7^4$ which themselves discard it to the current of cold air $f^{10}$ sweeping such external fins $7^3$ $7^4$.

Figure 3:
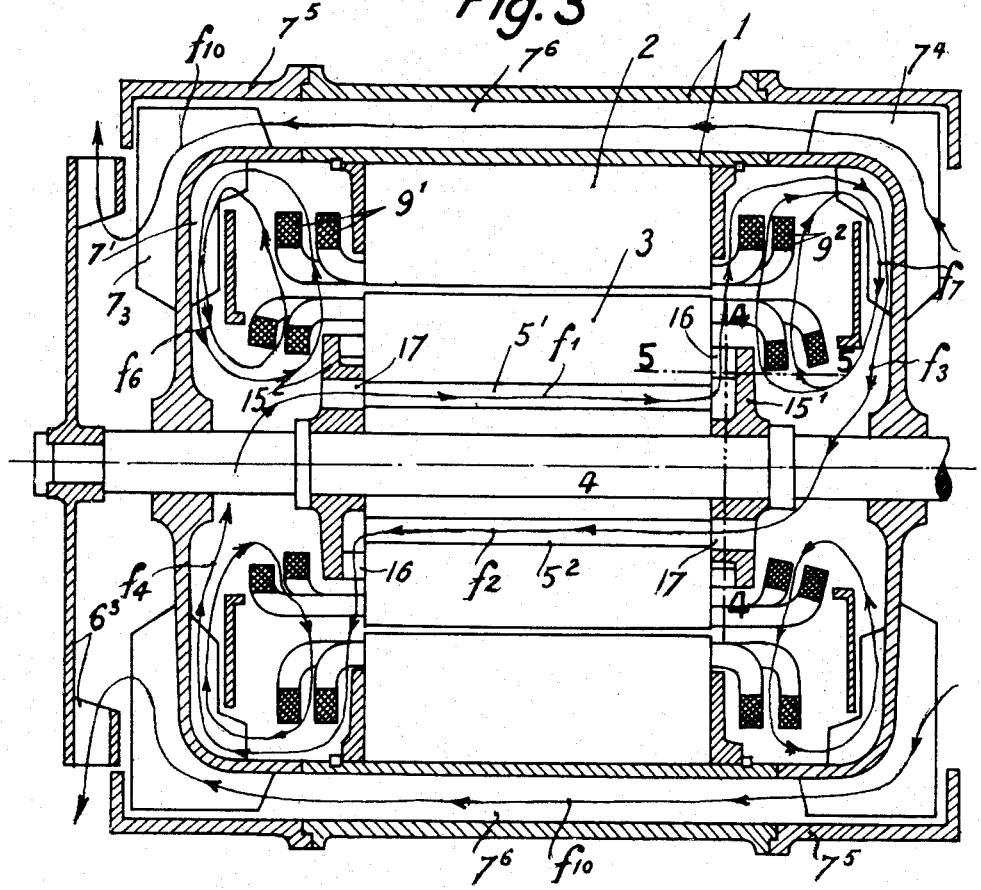
Fig. 3 is a longitudinal axial section of another embodiment of an electric machine according to this invention.
Figure 4:
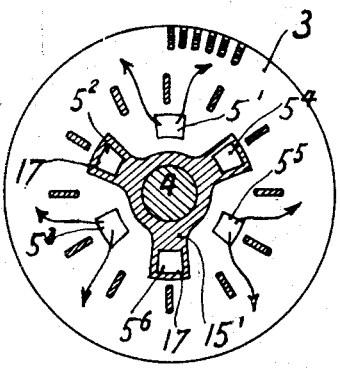
Fig. 4 is a partial section of this machine along the line 4—4 in Fig. 3.
Figure 5:
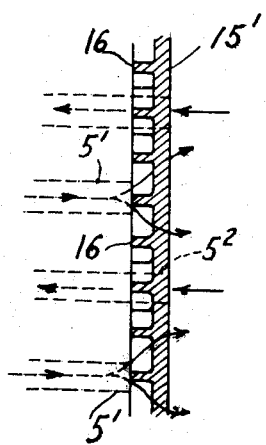
Fig. 5 is a developed partial cylindrical section along the line 5—5 in Fig. 3.

In the machine illustrated in Figs. 3 to 5, the fans located at each end of the rotor, consist of two end plates $15^1$ $15^2$ clamping the laminated mass which constitutes the rotor 3, these plates $15^1$ $15^2$ on the one hand presenting on the bearing face of each, ribs 16 (Fig. 5) which form radial ducts into which open the ends of each of the axial ducts of the rotor, such as $5^1$ $5^3$ $5^5$. On the other hand, these plates $15^1$ $15^2$ present apertures $17$ which come opposite the radial ducts of the rotor such as $5^2$ $5^4$ $5^6$.

When the rotor 3 rotates, the end plates $15^1$ $15^2$ turn therewith, and air is drawn into the axial ducts $5^1$ $5^2$ ... by the plate $15^1$ and its ribs $16$, whilst the air drawn into the axial ducts $5^2$ $5^4$ by the other plate $15^2$ passes freely out through the plate $15^1$ by way of the apertures $17$.

There is thus formed in the machine, on the one hand a main cooling air circuit $f^1$ $f^2$ $f^3$ $f^4$ as in the machine shown in Figs. 1 and 2, and on the other hand closed circuits $f^6$ $f^7$ derived from the main circuit, these closed circuits $f^6$ $f^7$ circulating about and cooling the heads of the windings $9^1$ $9^2$.

In the machine illustrated in Figs. 6 to 11, the fans $6^1$ $6^2$ located at each end of the rotor have on the one hand nozzles $12^1$ $12^2$ for the outlet of air drawn in by the axial ducts $5^1$ $5^3$ of the rotor and on the other hand free zones $13^1$ $13^2$ formed between the nozzles $12^1$ $12^2$ into which pass the closed cooling air circuits which sweep the heads of the windings $9^1$ $9^2$.

The vanes $14$ of each fan $6^1$ $6^2$ located opposite the free zones $13^1$ $13^2$ determine the formation of the closed circuits $f^6$ $f^7$ in cooperation with a partition $15$ fixed on the casing $1$ of the stator.

The heads of the windings $9^1$ $9^2$, in their rotation may themselves ensure the formation of the closed circuits $f^6$ $f^7$. In such case, the fans $6^1$ $6^2$ located at each end of the rotor effect only the formation of the main cooling circuit circulating in both directions through the axial ducts $5^1$ $5^3$ of the rotor.

Moreover, in this electric machine of Figs. 6 to 11 the rotor is constituted by a laminated mass the laminae of which are threaded and fixed on a spider 20 forming a communicating means. The arms $21^1$ $21^2$ of the spider form with the eyes of the annular laminae axial ducts $5^1$ $5^2$ $5^3$ $5^4$. Between the arms $21^1$ $21^2$ of the spider, inclined partitions 22 are arranged which vary the section of each axial duct $5^1$ $5^2$ in the same direction as the air current traversing these axial ducts.

The axial ducts $5^1$ $5^3$ are traversed for example by the current of air $f^1$, and the axial ducts $5^2$ $5^4$ are traversed by the current of air $f^3$ inverse to $f^1$.

The axial ducts $5^1$ $5^2$ $5^3$ ... are divided into two compartments by the inclined partitions 22, and such compartments intercommunicate by lamellar ducts 25 parallel to the planes of the laminae and constituted for example by notches 26 formed in alternate laminae. In this manner, the current of air circulating in the axial ducts $5^1$ $5^3$ passes from one compartment to the other, sweeping the lamellar ducts 25 and cooling the rotor.

In the form of construction of Figs. 12 to 18, the rotor is constituted by laminae directly secured on the imperforate shaft of the rotor. These laminae (Figs. 14 and 15) have angularly spaced apertures which, when the laminae are superposed, form on the one hand axial ducts $5^1$ $5^2$ $5^3$ $5^4$ and on the other hand multiple lamellar ducts 30 providing intercommunication between the axial ducts. Oblique partitions 22 are arranged in the axial ducts $5^1$ $5^2$ thus formed, dividing these ducts into two compartments (Fig. 16), these compartments being closed at one of their ends. The inclined partition 22 ensures a variation of section along the length of each axial duct in conformity with the discharge of the main air current which feeds the air currents traversing the lamellar ducts 30.

Moreover, in this machine the stator 2 is constituted by laminae which present on their periphery stamped out zones, at which apertures are formed, as shown in Fig. 17. When the laminae are superposed, these apertures form peripheral axial ducts 40 in the mass of the stator.

A single fan 6 keyed at one of the faces of the rotor, draws in air which traverses the axial ducts 5 of the rotor and discharges such air into the peripheral ducts 40 of the stator, the closed circuit thus formed becoming cooled before its entry into the ducts 40 of the stator, by sweeping the internal fins 7 carried by the carcass 1 of the stator.

As in the preceding examples, the casing 1 also comprises external fins $7^3$ $7^4$ cooled by a current of cold air $f^{10}$.

In this form of construction the current of cold air $f^{10}$ is conducted by the axial ducts formed in the carcass (Fig. 18) and sweeps at the same time fins 50 cut in the laminae of the stator, and which are located in these axial ducts.

To sum up, according to the invention electric machines are produced in which the mass of air in motion is of small volume and effectively ensures the cooling of the members of the machine whilst being itself cooled by heat exchange during its passage in a closed circuit through the elements of the machine.

I claim:

1. In an electric machine, a stator, a shaft rotatably journalled in said stator, a spider mounted on said shaft and having arms providing between them axial ducts, laminae threaded on to said spider having fins and constituting a rotor having a laminated mass, inclined partitions mounted in said axial ducts and varying the section thereof in proportion to the flow and in the direction of the current of air traversing said axial ducts and the branch currents of which sweep the fins of the laminae of the rotor, air circulating means mounted on said rotor and producing a current of air traversing said axial ducts in one direction and then in the other, and cooling means carried by said stator and disposed on the path of the current of air between the outlet of one of said axial ducts and the inlet of another duct.

2. In an electric machine, a shaft adapted to turn therein, a spider mounted on said shaft and having arms providing between them axial ducts, laminae threaded onto said spider and constituting a rotor having a laminated mass, said laminae having internal notches forming between said laminae lamellar ducts communicating with said axial ducts, inclined partitions mounted in said axial ducts and varying the section of said axial ducts in proportion to the flow and in the direction of the current of air traversing said axial ducts and the branch currents of which pass through said lamellar ducts, air circulating means mounted on said rotor and producing a current of air traversing said axial ducts in one direction and then in the other, and cooling means carried by said stator and disposed in the path of the current of air between the outlet of one of said axial ducts and the inlet of the other duct.

3. In an electric machine, a stator, a shaft rotatably journalled therein, perforated laminae threaded onto said shaft constituting a rotor having a laminated mass, the perforations of said laminæ forming, on the one hand, axial ducts providing communication between the two opposite faces of said rotor and, on the other hand, lamellar ducts communicating with said axial ducts, inclined partitions mounted in said axial ducts and varying the section of said axial ducts in proportion to the flow and in the direction of the current of air traversing said axial ducts, air circulating means mounted on said rotor and producing a current of air traversing said axial ducts some in one direction and others in the other direction, and cooling means carried by said stator and disposed in the path of the current of air between the outlet of one of said axial ducts and the inlet of another.

4. In an electric machine, a stator, a shaft rotatably journalled therein, perforated laminæ mounted on said shaft constituting the rotor having a laminated mass, said laminæ by their contour forming air passages parallel with the plane of said laminæ being perpendicular to said shaft, communicating means forming axial ducts providing communication between the two opposite faces of said rotor and also communicating with the said air passages parallel with the plane of said laminæ, air circulating means mounted on said rotor and producing a current of air traversing certain axial ducts in one direction and others in the other direction, and cooling means carried by said stator and disposed in the path of the current of air between the outlet of one of said axial ducts and the inlet of another duct.

5. In an electric machine, a stator, a shaft rotatably journalled in said stator, a spider having arms and mounted on said shaft and providing between said arms axial ducts, laminæ threaded onto said spider and constituting a rotor having a laminated mass, said laminæ by their contour constituting air-passages parallel with the plane of said laminæ and perpendicular to said shaft, said air-passages communicating with said axial ducts, air circulating means mounted on said rotor and producing a current of air traversing certain of said axial ducts in one direction and others in the other direction, and cooling means carried by said stator and disposed in the path of the current of air between the outlet of one of said axial ducts and the inlet of the other duct.

6. In an electric machine, a stator, a shaft rotatably journalled in said stator, perforated laminæ mounted on said shaft and constituting the rotor having a laminated mass, the perforations in said laminæ forming axial ducts providing communication between the opposed ends of the rotor, said laminæ moreover forming by their contour air-passages parallel with the plane of the laminæ and perpendicular to said shaft, said air-passages communicating with said axial ducts, air-circulating means mounted on said rotor and causing a current of air traversing certain of said axial ducts in one direction and others in the other direction, and cooling means carried by said stator and disposed in the path of said air-current between the outlet of one of said axial ducts and the inlet of another axial duct.

7. In an electric machine, a fixed casing provided with ducts for the circulation of outside air, laminæ disposed one against the other in said casing and constituting the stator having a laminated mass, laminæ formed with cooling fins located in the ducts of said casing, a shaft rotatably journalled in said stator, laminæ fixed on said shaft and constituting the rotor having a laminated mass, said laminæ by their contour forming passages for the flow of inside air parallel with the plane of said laminæ and therefore perpendicular to said shaft, communicating means forming axial ducts providing communication between the two opposite faces of said rotor and communicating with said air passages parallel with the plane of the laminæ of said rotor, air circulation means mounted on said rotor and producing a current of air traversing certain of said axial ducts in one direction and then others of said axial ducts in another direction, and cooling means carried by said stator and disposed in the path of the air current between the outlet of one of said axial ducts and the inlet of another axial duct.

8. In an electric machine, a fixed casing provided with ducts for the circulation of outside air, external fins located in said ducts and internal fins provided on the inner wall of said casing, laminæ placed one against the other in said casing and constituting a stator having a laminated mass, laminæ formed with cooling fins provided in the ducts of said casing, a shaft rotatably journalled in said stator, laminæ fixed on said shaft and constituting the rotor having a laminated mass, said laminæ by their contour forming passages for the flow of inside air parallel with the plane of said laminæ and, therefore, perpendicular to said shaft, communicating means forming axial ducts providing communication between the two opposite faces of said rotor and communicating with said air ducts parallel with the plane of the laminæ of said rotor, air circulating means mounted on said rotor and producing a current of air traversing certain of said axial ducts in one direction and then others of said axial ducts in the other direction, said air current sweeping the internal fins of said casing between the outlet of one axial duct and the inlet of another axial duct.

PAUL EHRMANN.